United States Patent
Affeldt et al.

(10) Patent No.: US 6,343,554 B1
(45) Date of Patent: Feb. 5, 2002

(54) VEHICLE WHEEL, IN PARTICULAR FOR A LOW-PLATFORM VEHICLE

(75) Inventors: Marek Affeldt, Stein; Andreas Brinkmann, Remscheid; Reinhard Pieper, Kirchhunden, all of (DE)

(73) Assignee: Bombardier Transportation GmbH, Berlin (DE)

( * ) Notice: Subject to any disclaimer, the term of this patent is extended or adjusted under 35 U.S.C. 154(b) by 0 days.

(21) Appl. No.: 09/264,931

(22) Filed: Mar. 9, 1999

(30) Foreign Application Priority Data

Mar. 20, 1998 (AT) .................................................. 497/98

(51) Int. Cl.[7] ................................................ B61C 9/00
(52) U.S. Cl. ............................ 105/96; 105/136; 295/5; 295/11
(58) Field of Search ............... 105/96, 136; 188/218 R, 188/218 XL, 271, 290, 296; 180/242; 295/5, 11; 301/6.1, 6.5, 6.7, 6.8; 308/191

(56) References Cited

U.S. PATENT DOCUMENTS

| | | | | |
|---|---|---|---|---|
| 420,543 A | * | 2/1890 | Peckham | 295/11 |
| 3,835,788 A | * | 9/1974 | Paul et al. | 105/136 |
| 4,047,770 A | * | 9/1977 | Korenhof et al. | 308/191 |
| 4,102,443 A | * | 7/1978 | Kohler et al. | 188/218 XL |
| 4,407,382 A | * | 10/1983 | Dziuba et al. | 180/10 |
| 4,679,665 A | * | 7/1987 | Smith | 188/218 R |
| 4,721,313 A | * | 1/1988 | Pennink | 277/53 |
| 4,913,258 A | | 4/1990 | Sakurai et al. | 180/242 |
| 5,108,156 A | * | 4/1992 | Bell | 301/6 R |
| 5,328,252 A | * | 7/1994 | Thompson | 301/64.4 |
| 5,328,275 A | * | 7/1994 | Winn et al. | 384/472 |
| 5,372,073 A | * | 12/1994 | Cattani | 105/3 |
| 5,775,229 A | * | 7/1998 | Folk et al. | 105/157.1 |
| 5,813,938 A | * | 9/1998 | Forster | 180/372 |
| 5,890,567 A | * | 4/1999 | Pete et al. | 188/218 R |
| 5,904,102 A | * | 5/1999 | Brinkmann et al. | 105/96 |
| 5,915,306 A | * | 6/1999 | Langhorst et al. | 105/157.1 |
| 5,957,058 A | * | 9/1999 | Dampmann et al. | 105/96.1 |

FOREIGN PATENT DOCUMENTS

| | | |
|---|---|---|
| DE | 3507232 | 9/1986 |
| EP | 0337032 | 10/1989 |
| EP | 0448147 | 9/1991 |
| EP | 0464929 | 1/1992 |
| EP | 0492290 | 7/1992 |
| EP | 0579084 | 1/1994 |
| EP | 0626286 | 11/1994 |
| EP | 0698540 | 2/1996 |
| HU | 215718 | 3/1999 |

* cited by examiner

Primary Examiner—S. Joseph Morano
Assistant Examiner—Lars A. Olson
(74) Attorney, Agent, or Firm—Ladas & Parry

(57) ABSTRACT

A vehicle wheel includes a wheel hub rotatably mounted on a stationary axle and a running tread, tire or the like connected with the wheel hub. A device for connecting structural components such as, for instance, a transmission part or a brake disk, for the purpose of transmitting a torque between the wheel hub and the structural component to be connected is provided on the external end face of the wheel hub. In order to provide a modularly designed vehicle wheel easy to mount and dismount, the device for connecting structural components is applicable facultatively and a fastening device spacially separated from the device for facultatively connecting structural components is provided on the external end face of the wheel hub. The vehicle wheel may be designed as a driven wheel or a loose wheel with or without brake. By separating torque transmission and power transmission, mounting and dismounting of the vehicle wheel is substantially facilitated.

25 Claims, 5 Drawing Sheets

VEHICLE WHEEL, IN PARTICULAR FOR A LOW-PLATFORM VEHICLE

BACKGROUND OF THE INVENTION

1. Field of the Invention

The invention relates to a vehicle wheel, in particular for a low-platform vehicle, of the type including a wheel hub rotatably mounted on a stationary axle and a running tread, tire or the like connected with the wheel hub optionally in an elastic manner, wherein a means for connecting structural components such as, for instance, a transmission part or a brake disk, for transmitting a torque between the wheel hub and the structural component to be connected is provided on the external end face of the wheel hub.

The following description of the the invention primarily relates to rail vehicles, yet is applicable also to vehicles not bound to rails, using a tire or the like instead of the running tread connected with the wheel hub. The application of the vehicle wheel according to the invention is conceivable also in buses and, in particular low-platform busses, socalled people movers or trolley busses.

2. Prior Art

In vehicles, differentiation is made primarily between wheels that are driven and wheels that follow without being driven, socalled loose wheels. Other distinctive features relate to wheels with brakes or the like. Construction usually varies with the type of vehicle wheel. In case of a driven wheel, the latter is connected with the motor via a transmission. In the case of a loose or free wheel, the wheel merely is rotatably journaled on the axle. In known vehicles, the coupling of the wheel with the transmission and the motor in most cases is installable and removable only at great expenditures. In particular with low-platform vehicles, which have been gaining more and more importance especially in public transport, the accommodation of the transmission and the motor is difficult to realize due to the small space available. In order to be able to observe the minimum width required in the interior of a low-platform wagon, the motor as well as the transmission in low-platform vehicles usually are located outside the wheels. With rail vehicles, the distance of the wheel, in turn, is precisely defined by the width of the rails. In order to avoid excessive vehicle dimensions, an arrangement as space-saving as possible is, therefore, sought for the transmission and the drive. With known rail vehicles, the drive in most cases is located beside the vehicle wheel, the torque being transmitted to the wheel tire via a transmission, e.g., a cardan transmission. An additional requirement, in particular for low-platform rail vehicles, is that the space provided between two axles of a bogie should be available for passenger seats.

Wheel hub drives in which the vehicle wheel is connected with the drive via a transmission are known, for instance, from DE 35 07 232 A1 or EP 0 626 286 A2. Such wheel hub drives in most cases involve relatively high expenditures in terms of mounting and dismounting.

Also used are wheel hub motors in which the wheel is connected with the drive directly without any transmission being interposed. These are, however, usually more expensive in terms of production cost. Furthermore, transmissions flanged to the wheel disk, thereby realizing the connection between the drive and the wheel tire, have been known. Such vehicle wheels are known, for instance, from EP 0 464 929 A2, EP 0 579 084 A1 and U.S. Pat No. 4,913,258 A.

Individually driven wheels with pressed-on gears are advantageous in terms of space demand, yet the change of a wheel is cumbersome due to the gear being difficult to remove. Also when using a mitre gear, the change of a wheel always involves the complete detachment of the gear.

SUMMARY OF THE INVENTION

It is the object of the invention to design a vehicle wheel in a manner that it may be used universally, both as a driven wheel and as a loose wheel with or without additional structural components such as, for instance, brakes. The conversion of a wheel from the driven to the undriven form or vice versa, or, for instance, the furnishing of a wheel with a brake is to be feasible as quickly and simply as possible. The vehicle, thus, is to be readily adaptable to the respective requirements by the manufacturer. Drawbacks of known constructions are to be avoided or at least reduced.

The object according to the invention is achieved in that the means for connecting structural components is applicable replaceably and that at least one fastening means spacially separated from said means for connecting the structural components is provided on the external end face of the wheel hub. Thus, one and the same wheel may be employed as a driven wheel or as a loose wheel by replaceably coupling a transmission or a brake disk to the wheel hub or attaching no structural component at all or merely a cover or the like. Such a wheel structure substantially facilitates the production of vehicle components, since the number of different components to be optionally produced on demand is reduced and few modules will do. It may, for instance, be necessary with streetcars that have to overcome higher gradients to provide more driven wheels than with streetcars running evenly. Thus, the vehicle manufacturer is able to produce components independently of the future purchaser aid assemble the same prior to their delivery as a function of the respective requirements. By the spacial separation of the torque transmission from other attachments, mounting and dismounting of the vehicle wheel is facilitated.

According to a further characteristic feature of the invention, it is contemplated that the means for replaceably connecting structural components comprises formations such as, for instance, toothings or the like and the structural components to be connected comprise correspondingly shaped complementary formations in order to provide a rotationally fast positive engagement between the wheel hub and the structural components to be connected. The safe transmission of the torque to the wheel, or from the wheel, is thereby ensured.

According to a preferred configuration variant, the means for replaceably connecting structural components is constituted by a radial step in the wheel hub, wherein at least two fastening facilities, for instance internally threaded bores, bolt connections, screw connections or the like, are provided preferably at equal distances from the axis of rotation and at equal angular distances. The structural component to be replaceably connected, such as, for instance, a transmission part or a brake disk, in this case is designed to fit into that recess. An accordingly symmetric arrangement of the connecting screws or the like for the detachable connection of the wheel hub with the respective structural component together with the radial step ensures the smooth run of the vehicle wheel during operation. The radial step may, of course, be replaced with a flange-type connection provided on the end face of the wheel hub.

Advantageously, the or each fastening means is formed by at least two internally threaded bores, bolt connections, screw connections or the like, preferably at equal distances from the axis of rotation and at equal angular distances. The symmetric arrangement again safeguards the smooth run of the wheel during operation.

In case of a driven wheel, the means for connecting structural components according to a preferred embodiment comprises an adapter ring including an end toothing engaging the end toothing of a hollow shaft arranged about the axle, said hollow shaft being drivable via a pinion shaft of a motor, and a connection piece including a preferably central bore provided with an internal thread or the like is connected with the or each fastening means and the hollow shaft is connected in a power-transmitting manner with the wheel hub via a central screw or the like engaging in the bore optionally upon interposition of a pressure disk or the like. With a driven vehicle wheel, this construction enables the separation of the torque transmission from the power transmission, thereby substantially facilitating mounting or dismounting and hence servicing of the vehicle wheel, since the connection of the transmission parts to the wheel hub is not effected in a power-transmitting manner. The vehicle wheel may be separated from the transmission merely by undoing the central screw or the like. The adapter ring connected with the wheel hub secures the transmission of the torque onto the vehicle wheel. Unlike with prior art solutions, the transmission in this case need no longer be opened, since the connection of the transmission with the wheel hub may be realized without pressing engagement.

According to a further characteristic feature of the invention, the adapter ring with its end toothing also may be produced in one piece with the wheel hub, for instance by casting. This constitutes a further saving of costs in the production of the vehicle wheel.

For an undriven braked vehicle wheel, it is contemplated according to one embodiment of the invention that a brake disk is arranged on the means for replaceably connecting structural components and a caliper adapter for receiving the brake caliper is connected with the axle. Like the axle, the caliper is fixed relative to the rotating brake disk. Few manipulations allow the brake of the loose wheel to be mounted or dismounted and hence serviced.

In order to seal the rotating parts relative to the fixed parts, a sealing ring, preferably including a labyrinth seal, is arranged on the or each fastening means according to a further structural variant of a braked loose wheel.

In case of an unbraked loose wheel, a cover element or the like may be arranged on the means for replaceably connecting structural components and/or a cap or the like may be arranged on the or each fastening means, the underlying structures thus being protected against contamination and damage.

BRIEF DESCRIPTION OF THE DRAWINGS

Further characteristic features of the invention will be explained in more detail by way of the accompanying drawings, wherein:

FIG. 1b is a side view of the bogie according to FIG. 1a;

DETAILED DESCRIPTION OF PREFERRED EMBODIMENTS OF THE INVENTION

Figure 1B:
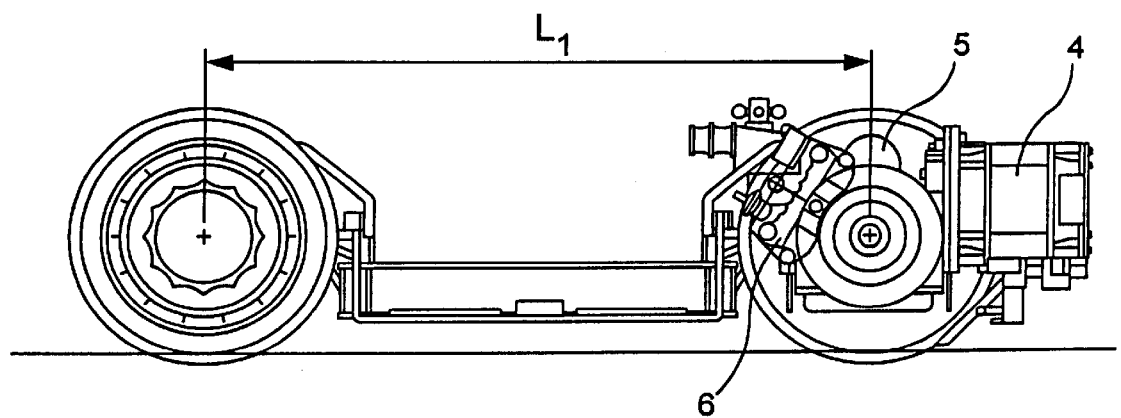
Figure 1A:
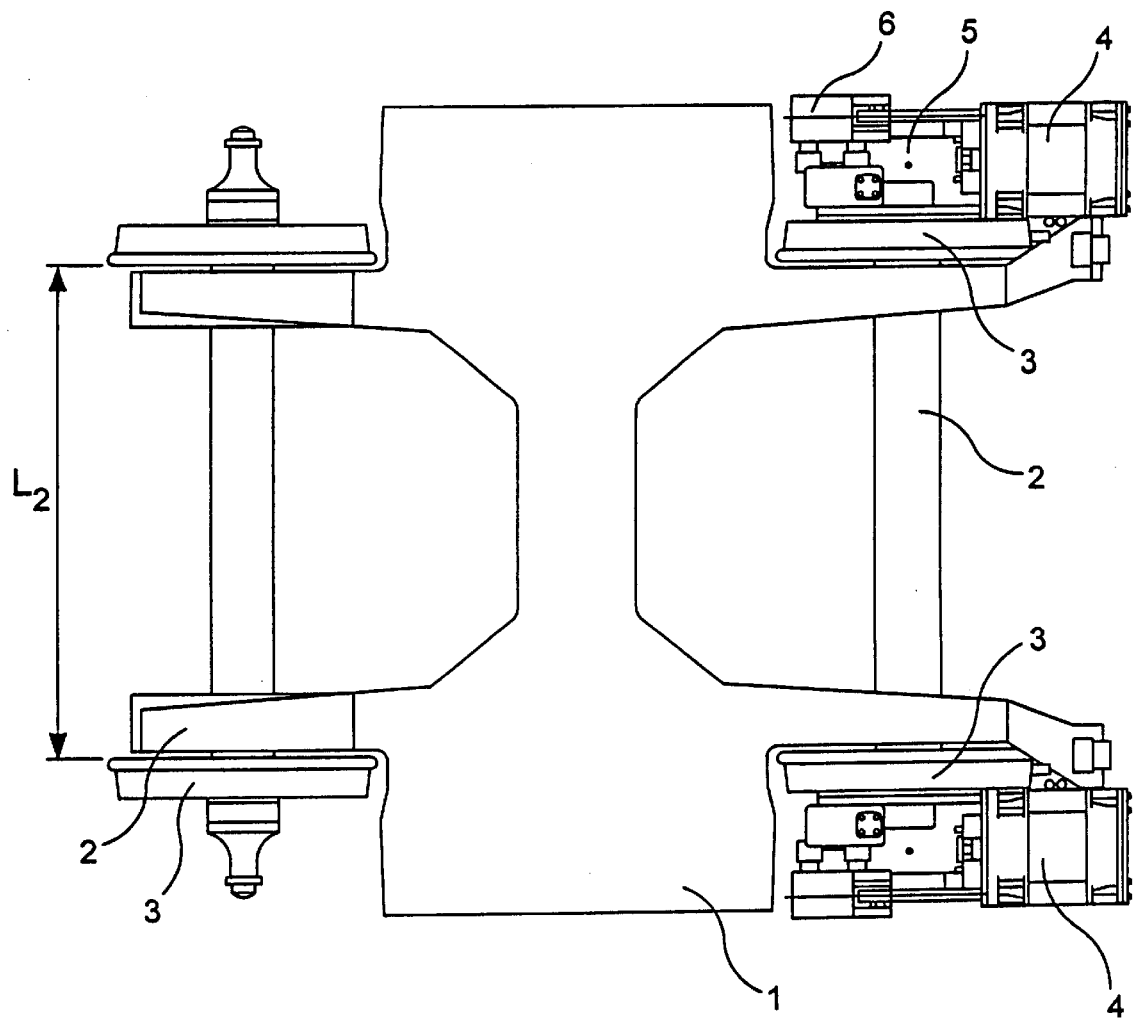
FIG. 1a is a top view on the bogie of a low-platform rail vehicle.

FIGS. 1a and 1b depict a bogie 1 of a low-platform rail vehicle in top view and side view. The bogie 1 comprises two axles 2, the wheels of one of the axles, i.e., the right-hand axle in the Figure being driven and the wheels of the other axle following without being driven. The bogie 1 is usually connected with the body of the vehicle via spring assemblies (not illustrated). In particular with low-platform vehicles, the space between the wheels 3 of an axle 2 is to be kept as clear as possible in order to enable passengers to move on without having to pass steps. Accordingly, no installations should possibly be provided between the wheels 3 of an axle along length $L_1$. Moreover, it is suitable, and in most cases even required, to keep the area between the axles 2 of a bogie 1 corresponding to length $L_2$ as free of installations as possible in order to install seats while providing appropriate foot space and utilizing the area to the optimum degree. An accordingly small space is available for a means driving wheels 3. In the exemplary embodiment illustrated, the two driven wheels 3 are each driven by a longitudinally arranged motor 4, i.e., oriented in the moving direction, which is connected with the wheel 3 via a transmission 5. Both the driven and the undriven wheels 3 may also include a brake 6. With known wheel connections, removal, in particular, of a driven wheel 3 is relatively cumbersome, since optionally present brakes 6 have to be dismounted first, then the transmission 5 has to be opened and drawn off the wheel 3, and finally the wheel 3 has to be exchanged.

Moreover, loose wheel axles and driven axles are realized differently in known structures, which renders difficult subsequent modifications due to different requirements. For that reason, vehicles and their components in most cases must be manufactured according to the respective demands.

Figure 2:
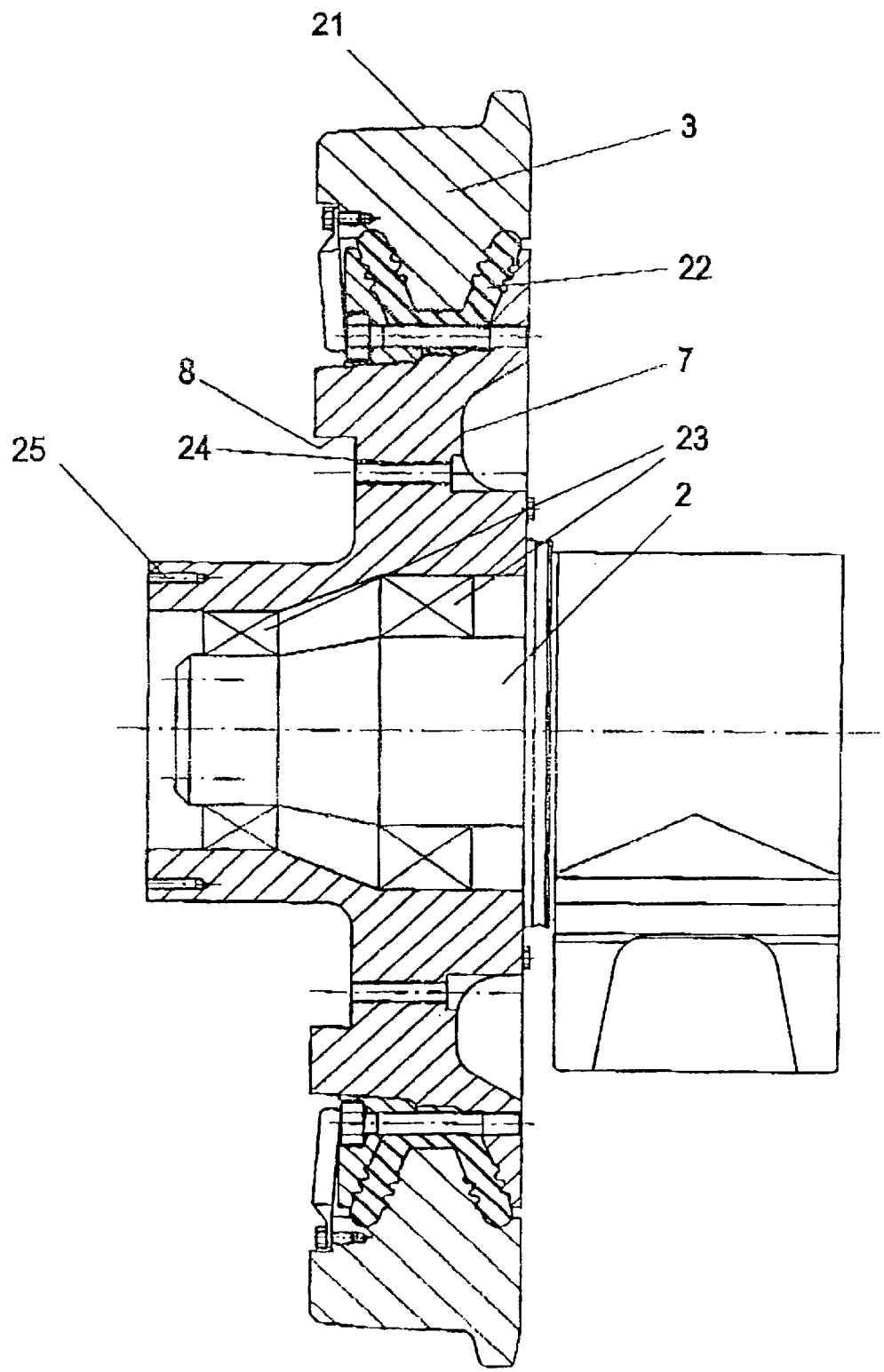
FIG. 2 illustrates an embodiment of the wheel according to the invention for a rail vehicle.

FIG. 2 depicts an embodiment of a wheel 3 according to the invention for a rail vehicle. The wheel 3 may be produced in one piece or a running tread 21 may be connected with the wheel hub 7 via an elastic element 22. The wheel hub 7 is mounted on a stationary axle 2 by means of roller bearings 23. In accordance with the invention, the wheel hub 7 on its external end side comprises a means for replaceably connecting structural components in order to transmit a torque between the wheel hub 7 and the structural components to be connected, said means being constituted by a radial step 8 provided in the wheel hub 7. In order to secure those components to which the torque is to be transmitted, fastening means, for instance in the form of bores 24, may be provided. The bores 24 preferably are arranged at equal spacing from the axis of rotation and at equal angular distances and may each be provided with an internal thread for receiving fastening screws 16. Instead of the bores 24, bolts (not illustrated) may be provided oil the wheel hub 7. The purpose of such bores 24, bolt connections, screw connections or the like is to secure against rotation relative to the wheel hub 7 the structural components to be connected, to which the torque is to be transmitted. Bores 25 or the like, which preferably are each provided with an internal thread, are arranged on the outermost end face of the wheel hub 7 for attaching additional components. There again, the bores 25 may be replaced with bolt connections, screw connections or the like (not illustrated). Depending on the application of the wheel, different structural components are fastened to this connection site.

Figure 3A:
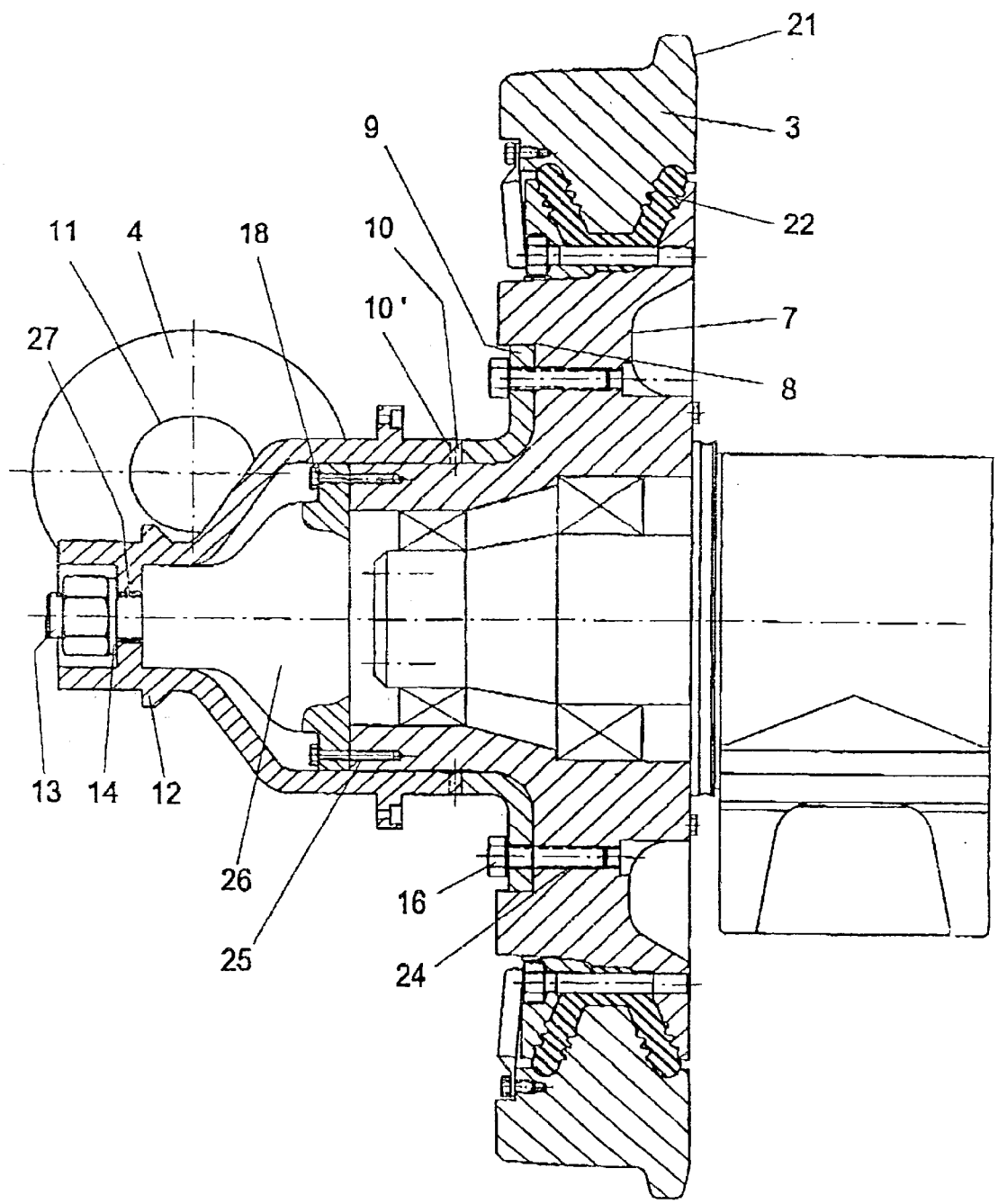
FIG. 3a is a variant of the vehicle wheel according to FIG. 2 as a driven wheel without brake.

FIG. 3a depicts a variant according to the invention of the wheel 3 according to FIG. 2 as a driven wheel 3 without brake for a low-platform rail vehicle. The wheel 3 is coupled to a longitudinally arranged transmission (not illustrated), whose pinion shaft 11 is visible. Into the means for replaceably connecting a structural component according to the invention in the form of a radial step 8, an adapter ring 9 is inserted and secured against rotation by means of fastening screws 16 engaged in the bores 24 of the wheel hub 7. Complementarily shaped elements (not illustrated) may be provided on the wheel hub 7 and adapter ring 9 for centering and preventing rotation. In the example of a driven wheel illustrated, the adapter ring 9 comprises a end toothing 10 via which the torque of the motor 4 is transmitted to the wheel 3. In the example illustrated, the torque of the drive motor 4 via the pinion shaft 11 of the transmission is transmitted to a hollow shaft 12 meshing with the end toothing 10 of the adapter ring 9 by its end toothing 10'. In order to provide sufficient power-transmitting engagement, a connection piece 26 is fastened to the wheel hub in the arrangement according to the invention for power transmission, for instance, by means of fastening screws 18 which are screwed into the bores 25 of the wheel hub 7. The connection piece 26 has a central bore 27, via which the hollow shaft 12 is connected with the wheel hub 7 by means of a central screw 13 in a power-transmitting manner with a pressure disk 14 being interposed. The central screw 13 and bore 27 may, of course, be replaced with other fastening elements. The pressure disk 14 is not absolutely necessary, either. What is essential in the construction is the spacial separation of the torque transmission from the power transmission. Dismounting or mounting of the driven wheel 3 is thereby facilitated, since no transmission parts need be opened in a cumbersome manner and no pressing connections need be undone.

Figure 3B:
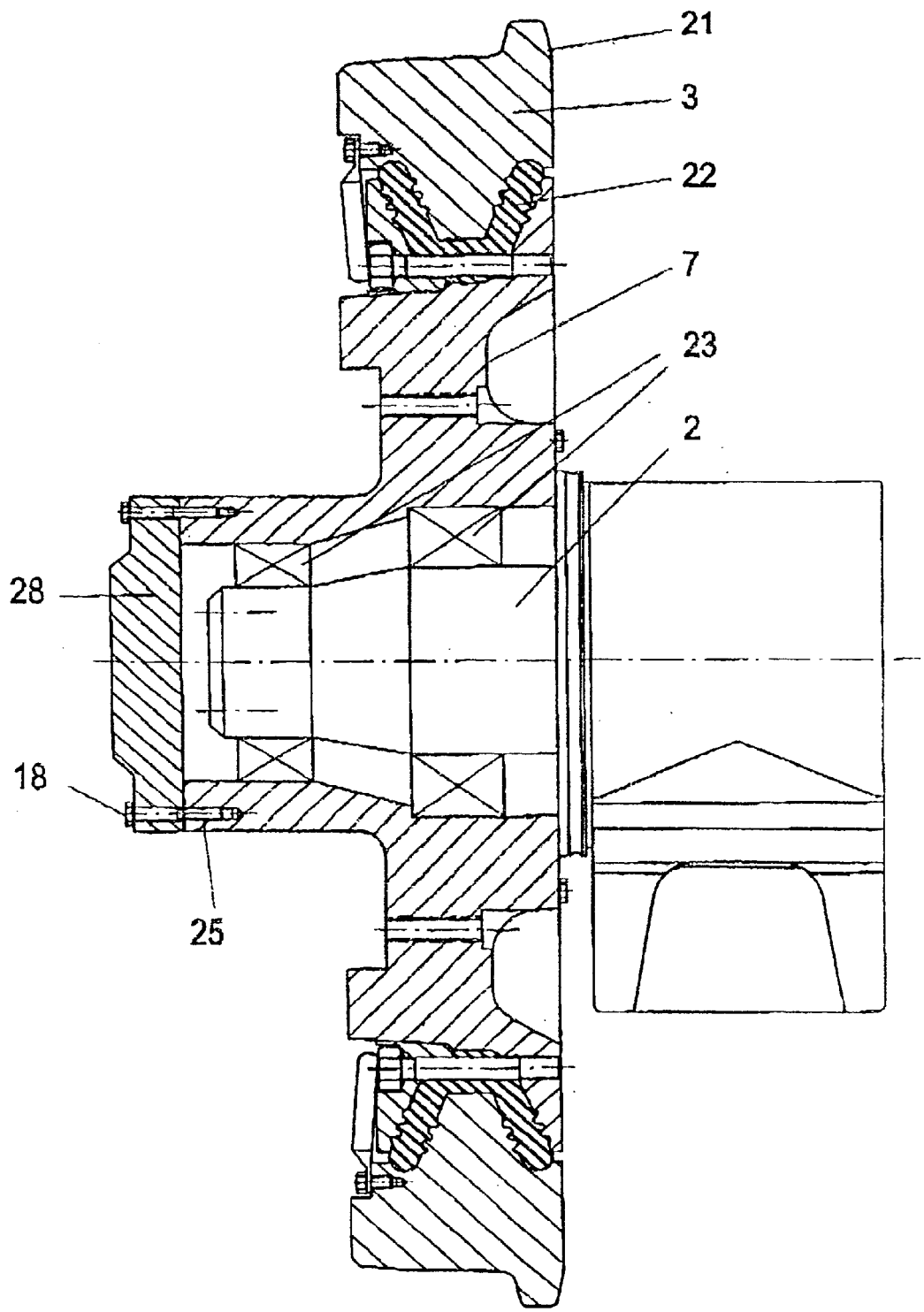
FIG. 3b is a variant of the vehicle wheel according to FIG. 2 as an undriven wheel without brake.

FIG. 3b illustrates an embodiment of the wheel 3 according to the invention as an undriven and unbraked loose wheel. In that case, a simple cap 28 may be fastened to the wheel by means of fastening screws 18, which are turned into the bores 25 of the wheel hub 7. Since no torque transmission on, or from, other structural components takes place in that case, no structural component is attached to the radial step 8 provided on the external end face of the wheel hub 7. A protection cover or the like may, however, be provided thereat (not illustrated).

Figure 3C:
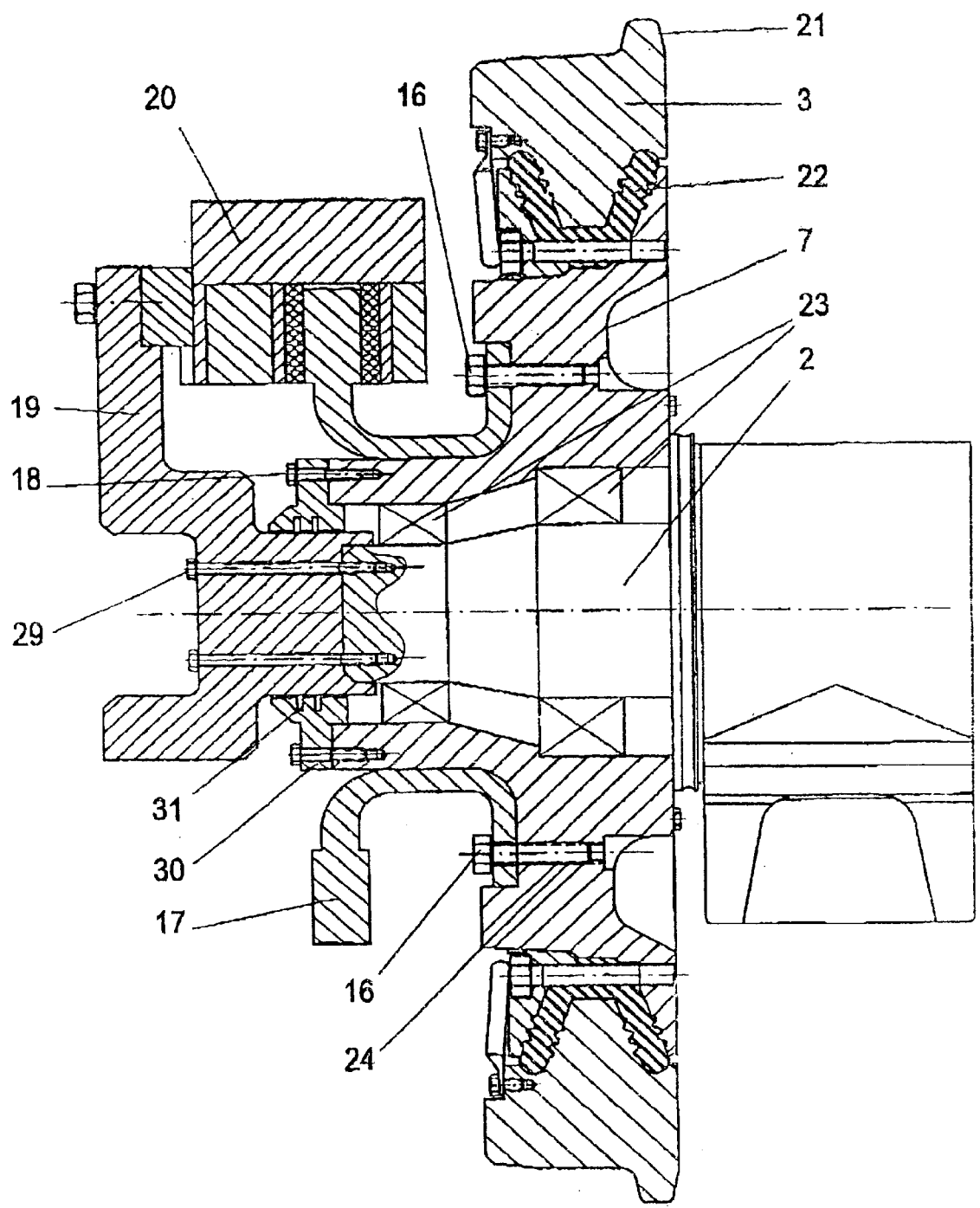
FIG. 3c is a variant of the vehicle wheel according to FIG. 2 as an undriven wheel with a disk brake.

FIG. 3c shows a variant of the wheel 3 as a loose wheel including a brake. In that case, instead of the adapter ring 9 used with the driven wheel 3 (cf. FIG. 3a), the brake disk 17 is connected with the wheel hub 7, for instance by means of fastening screws 16. The brake caliper 20 including the brake shoes (not illustrated) is connected with the stationary axle 2, for instance by means of fastening screws 29, via a caliper adapter 19. The wheel hub 7 and the brake disk 17 are rotating while the brake caliper 20 is stationary. A scaling ring 30 including a labyrinth seal 31 may be connected with the wheel hub 7 via fastening screws 18 in order to seal the rotating parts relative to the stationary parts.

What we claim is:

1. A vehicle wheel arrangement for a low-platform vehicle comprising a stationary axle, a wheel hub rotatably mounted on said stationary axle and having an external end face, a running ground-engaging element connected to said wheel hub for being driven therewith, and, means on said external end face of said wheel hub for connecting a structural component thereto to transmit a torque between said wheel hub and said structural component said means for connecting a structural component comprising means for replaceably connecting said structural component to said wheel hub and at least one fastening means spacially separated from said means for replaceably connecting said structural component provided on said external end face of said wheel hub, wherein said means for replaceably connecting the structural component comprises a recess in said wheel hub forming a step in said wheel hub, at least two said fastening means being provided to replaceably connect said structural component to said wheel hub, said wheel hub projecting axially away from said recess and having at said end face thereof a detachable means for selective attachment to said structural component.

2. A vehicle wheel arrangement as set forth in claim 1, wherein said means for interchangeably connecting the structural component comprises an engaging surface on said wheel hub and said structural component comprises a respective complementary engaging surface providing a rotationally fast positive engagement between said wheel hub and said structural component.

3. A vehicle wheel arrangement as set forth in claim 2, wherein said engaging surfaces of said wheel hub and said structural component include meshing teeth.

4. A vehicle wheel arrangement as set forth in claim 1, wherein said at least two fastening means are selected from internally threaded bores, bolt connections, and screw connections.

5. A vehicle wheel arrangement as set forth in claim 1, wherein said at least two fastening means are provided at equal distances from an axis of rotation of the wheel hub and at equal angular spacing.

6. A vehicle wheel arrangement as set forth in claim 1, wherein said at least one fastening means is selected from at least two internally threaded bores, bolt connections, or screw connections.

7. A vehicle wheel arrangement as set forth in claim 6, wherein said at least two internally threaded bores, bolt connections, and screw connections are provided at equal distances from an axis of rotation of said wheel hub and at equal angular spacing.

8. A vehicle wheel arrangement as set forth in claim 1, further comprising a motor including a pinion shaft, a hollow shaft arranged around said stationary axle and including a hollow shaft end toothing, said hollow shaft being drivable by said motor via said pinion shaft, an adapter ring arranged on said means for facultatively connecting the structural component and including an adapter ring end toothing, said hollow shaft end toothing being constructed to mesh with said adapter ring toothing, a connection piece including an internally threaded bore connected to said fastening means, and a central screw engaging in said bore to connect said hollow shaft with said wheel hub in a power-transmitting manner.

9. A vehicle wheel arrangement as set forth in claim 8, wherein said bore is a central bore.

10. A vehicle wheel arrangement as set forth in claim 8, further comprising a pressure disk interposed between said hollow shaft and said wheel hub.

11. A vehicle wheel arrangement as set forth in claim 8, wherein said adapter ring with said adapter ring end toothing is made in one piece with said wheel hub.

12. A vehicle wheel arrangement as set forth in claim 11, wherein said adapter ring with said adapter ring end toothing is made in one piece with said wheel hub by casting.

13. A vehicle wheel arrangement as set forth in claim 1, further comprising a brake disk arranged on said means for facultatively connecting the structural component and a brake caliper-receiving caliper adapter connected with said stationary axle.

14. A vehicle wheel arrangement as set forth in claim 1, further comprising a sealing ring arranged on said fastening means.

15. A vehicle wheel arrangement as set forth in claim 14, wherein said sealing ring includes a labyrinth seal.

16. A vehicle wheel arrangement as set forth in claim 1, further comprising a cover means arranged on said means for facultatively connecting the structural component a cap means arranged on said fastening means.

17. A vehicle wheel arrangement as set forth in claim 1, further comprising a cap means arranged on said fastening means.

18. A vehicle wheel arrangement as set forth in claim 1 wherein said means for interchangeably connecting said structural component to said wheel hub comprises a first replaceable connection between the structural component and the wheel hub and said at least one fastening means provides a second replaceable connection between said wheel hub and said structural component, the first connection being provided at an axis of rotation of said wheel hub around said stationary axle, the second connection being provided radially outwards of said first connection at a recess provided in an end face of said wheel hub, said first and second replaceable connections enabling connection of a cap to said wheel hub when the vehicle wheel is freely rotatable on the axle without external drive or brakes.

19. A vehicle wheel arrangement as set forth in claim 1, wherein said hub includes a radial portion at which the structural component is connected to the wheel hub and an axial portion extending axially from the radial portion and provided with said attachment means at said end fact thereof.

20. A vehicle wheel arrangement as set forth in claim 1, wherein said detachable means comprises a bolt.

21. A vehicle wheel arrangement for a low-platform vehicle comprising a stationary axle, a wheel hub rotatably mounted on said stationary axle and having an external end face, a running ground-engaging element connected to said wheel hub for being driven therewith, and, means on said external end face of said wheel hub for connecting a structural component thereto to transmit a torque between said wheel hub and said structural component, said means for connecting a structural component comprising means for replaceably connecting said structural component to said wheel hub and at least one fastening means spatially separated from said means for replaceably connecting said structural component provided on said external end face of said wheel hub, said means for replaceably connecting said structural component to said wheel hub including a recess provided in the wheel hub into which the structural component is fitted and secured to the wheel hub, said hub extending axially from said recess to terminate at said external end face on which said fastening means is provided so that said fastening means is spatially separated axially from said recess and radially inwards thereof and includes a bore for said fastening means.

22. The vehicle wheel arrangement of claim 21, wherein said bore in said radial end face of said hub extends axially and is threaded to receive said fastening means.

23. The vehicle wheel arrangement of claim 22, wherein said fastening means comprises a bolt.

24. The vehicle wheel arrangement of claim 22, comprising first and second axially spaced bearings between said axle and said wheel hub, said recess being axially located between said first and second bearings.

25. The vehicle wheel arrangement of claim 24, wherein said first bearing is axially located near said bore in said external end face of said wheel hub and the second bearing is axially located near said recess.

* * * * *